US008485471B2

(12) United States Patent
Patterson et al.

(10) Patent No.: US 8,485,471 B2
(45) Date of Patent: Jul. 16, 2013

(54) PASSIVE EJECTION SEAT ARM FLAIL RESTRAINT APPARATUS AND METHOD

(75) Inventors: Scott R. Patterson, Manitou Springs, CO (US); Bradley Mastrolia, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 377 days.

(21) Appl. No.: 12/893,217

(22) Filed: Sep. 29, 2010

(65) Prior Publication Data

US 2011/0114790 A1 May 19, 2011

Related U.S. Application Data

(60) Provisional application No. 61/261,055, filed on Nov. 13, 2009.

(51) Int. Cl.
*B64D 25/115* (2006.01)

(52) U.S. Cl.
USPC .............. 244/122 AG; 297/466; 297/487; 297/488

(58) Field of Classification Search
USPC ............ 244/122 R, 122 A, 122 AE, 122 AG, 244/122 AH, 122 B, 121; 297/216.1, 284.9, 297/411.2, 466, 486, 487, 488
See application file for complete search history.

(56) References Cited

U.S. PATENT DOCUMENTS

| | | | |
|---|---|---|---|
| 3,083,938 A | | 4/1963 | Brinkworth et al. |
| 3,214,117 A | | 10/1965 | James et al. |
| 4,081,156 A | | 3/1978 | Ideskar |
| 4,215,835 A | | 8/1980 | Wedgwood |
| 4,482,112 A | * | 11/1984 | Cummings ............ 244/122 AG |
| 4,508,294 A | * | 4/1985 | Lorch .................... 244/122 AG |
| 4,592,523 A | | 6/1986 | Herndon |
| 4,667,902 A | | 5/1987 | Zenobi |
| 4,676,462 A | | 6/1987 | Martin |
| 5,301,903 A | * | 4/1994 | Aronne ................. 244/122 AG |
| 5,415,366 A | | 5/1995 | Mastrolia |
| 5,464,246 A | * | 11/1995 | Castro et al. .............. 280/730.2 |

FOREIGN PATENT DOCUMENTS

DE 2813893 A1 * 10/1978
GB 1584269 2/1981

* cited by examiner

*Primary Examiner* — Joseph W Sanderson
(74) *Attorney, Agent, or Firm* — Cantor Colburn LLP

(57) ABSTRACT

An ejection seat arm flail injury prevention apparatus comprises a pair of rigid support arms on each side of the ejection seat that deploy outwardly to support a semi-rigid backstop substantially behind the ejection seat occupant. When the ejection seat is propelled out of the aircraft and is subjected to the windblast, the occupant's arms are allowed to flail in a rearward direction in the windblast until the occupant's arms impact the semi-rigid backstop. The backstop is semi-rigid in that it deforms sufficiently to enable the rearward motion of the occupant's arms to be arrested without impact injury, yet is sufficiently rigid to prevent the occupant's arms from rebounding off the backstop or striking the rigid support arms.

16 Claims, 3 Drawing Sheets

PASSIVE EJECTION SEAT ARM FLAIL RESTRAINT APPARATUS AND METHOD

CROSS-REFERENCE TO RELATED APPLICATIONS

This application claims priority of provisional application No. 61/261,055 filed Nov. 13, 2009.

BACKGROUND OF THE INVENTION

This invention relates to aircraft interior equipment, and more particularly, to aircraft ejection seats.

When a pilot or other aircraft occupant ejects from an aircraft moving at high speed, the occupant is subjected to various aerodynamic forces which, if not properly controlled, may lead to injury. One area of concern is the occupant's arms, which can be severely injured if allowed to flail uncontrollably in the windblast.

Various methods and devices have been proposed to restrain an ejection seat occupant's arms to prevent windblast flailing injuries. U.S. Pat. No. 3,074,669 to Bohlin teaches a plurality of tethers attached to the occupant's arms. As the ejection seat is propelled from the aircraft, the tethers draw the occupant's arms inward and restrain them to prevent windblast flailing. Although satisfactory in operation, the restraints taught by Bohlin are "active" in that they require the occupant to attach the tethers upon entering the aircraft. A significant disadvantage of all "active" systems is that they impose additional tasks on crewmembers in order for them to be readied, and may be improperly attached or ignored entirely by the crewmember, rendering them ineffective.

U.S. Pat. No. 4,592,523 to Herndon discloses a "passive" restraint system that includes a plurality of nets that deploy forward and inward to form a curtain surrounding the occupant. The restraint system disclosed in Herndon requires the added complexity of a pyrotechnic actuator to deploy the system and, because it wraps around the occupant, may interfere with the occupant's separation from the ejection seat after deployment.

U.S. Pat. No. 4,081,156 to Ideskar discloses a passive restraint system that includes a plurality of side curtains that deploy forward to form a cage around the occupant. Although the side curtains of Ideskar restrict the occupant's arms from moving outward, they do not prevent the occupant's arms from flailing upward and possibly over the leading edge of the side curtains.

What is needed is a passive restraint system that reliably prevents arm flail injuries without the disadvantages of the prior art passive restraints.

SUMMARY OF THE INVENTION

The present invention comprises an apparatus for preventing arm flail injuries to the occupant of an aircraft ejection seat. According to an embodiment of the invention, the arm flail injury prevention apparatus comprises a plurality of rigid outwardly-extending support arms that support a semi-rigid backstop deployed substantially behind the ejection seat occupant. When the ejection seat is propelled out of the aircraft and is subjected to the windblast, the occupant's arms are allowed to flail in a rearward direction in the windblast until the occupant's arms impact the semi-rigid backstop. The backstop is semi-rigid in that it deforms sufficiently to enable the rearward motion of the occupant's arms to be arrested without impact injury, yet is sufficiently rigid to prevent the occupant's arms from rebounding off the backstop or striking the rigid support arms. Once the backstop arrests the rearward motion of the occupant's arms, the windblast forces themselves press the occupant's arms safely against the backstop to prevent flailing. Because the backstop is completely passive, it requires no action on the part of the occupant to hook-in or otherwise ready the apparatus for use prior to takeoff. Additionally, because the backstop is deployed substantially behind the ejection seat occupant, it does not interfere with the occupant's separation from the ejection seat when the parachute is deployed.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
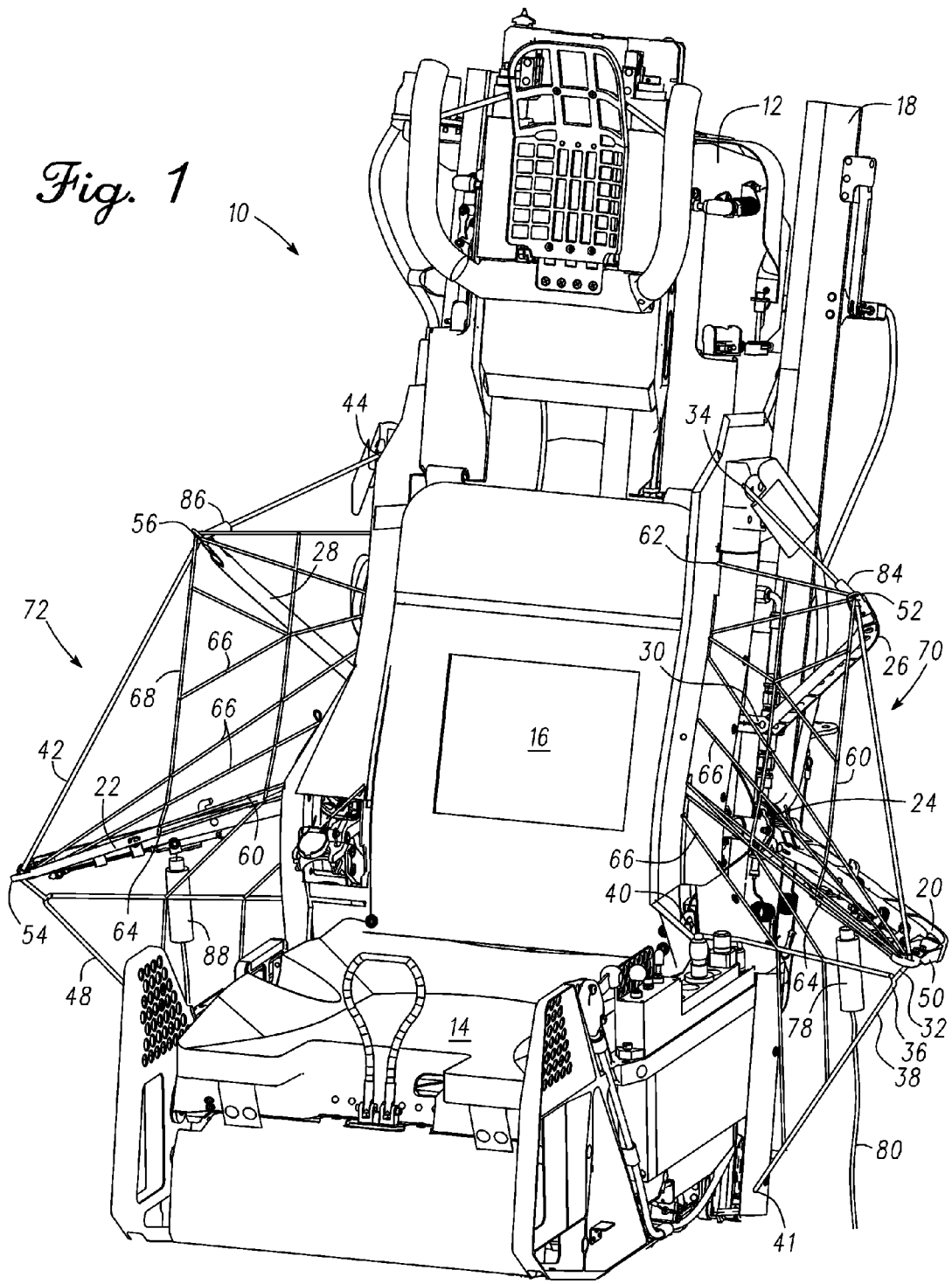
FIG. 1 is a front perspective view of an ejection seat incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to the drawing figures and with particular reference to FIG. 1, ejection seat 10 comprises a seat frame 12 having a seat pan portion 14 and a seat back portion 16. Seat frame 12 is formed of any suitable material including aluminum alloys, titanium alloys and/or composite materials but in the embodiment of FIG. 1 is composed of aluminum alloy. Ejection seat 10 is launched conventionally by means of a catapult and a solid rocket motor which propels ejection seat 10 out of the aircraft along launch rail 18. A lower support arm 20 is attached to frame 12 by means of a ratcheting hinge 24, the purpose of which will be explained more fully herein after. Lower support arm 22 is similarly attached to frame 12 by means of a ratcheting hinge (not shown). An upper support arm 26 is attached to frame 12 with a conventional non-ratcheting hinge 30. Upper support arm 28 is similarly attached to frame 12 by means of a non-ratcheting hinge (not shown). Upper and lower support arms 20, 22, 26, 28 may be formed of any suitably strong, rigid and lightweight material such as carbon fiber, titanium or aluminum alloy but in the illustrative embodiment of FIG. 1, arms 20, 22, 26 and 28 are formed of high-strength aluminum alloy having an I-beam cross section to maximize the area moment of inertia of the arms.

A primary cable 32 is secured at its upper end 34 to seat frame 12. The lower end 36 of primary cable 32 is spliced to a lower support cable 38 which is secured at its ends 40, 41 to seat frame 12. Primary cable 42 is similarly secured to seat frame 12 at its upper end 44 and is secured at its lower end 46 to a lower support cable 48 which is secured at its ends to seat frame 12. Primary cable 32 is routed through an eye at the free end 50 of lower support arm 20 and through an eye located at the free end 52 of upper support arm 26. Primary cable 42 is similarly routed through eyes in the free ends 54, 56 of lower support arm 22 and upper support arm 28, respectively. A secondary cable 60 is attached to frame 12 at an upper end 62. The lower end 64 of secondary cable 60 is attached to one of a plurality of tertiary cables 66 that run between frame 12 and a plurality of eyes located at free end 50 of lower support arm 20. Secondary cable 68 is of substantially identical construction as secondary cable 60 and therefore will not be discussed in detail herein. As can be determined from an inspection of FIG. 1, the cables discussed hereinbefore form a net-like backstop 70, 72 composed of a plurality of shrouds having very little frontal area that would cause wind resistance as compared with the area contained within the perimeter of primary cables 32 and 42.

The cables forming backstops 70 and 72 may be of any suitable material having sufficiently low elongation such that the force of the occupant's arm striking the backstop does not deform the backstop a sufficient distance for the occupant's arms to impact the support arms 20, 22, 26, 28. In the embodiment of FIG. 1, the cables comprise a woven aramid fiber having an elongation of approximately five percent (5%). The length of the cables are chosen such that as the arms deploy, the cables are tensioned to approximately 200 lbs. such that upon impact with a $90^{th}$ percentile occupant's arms at 600 knots, the backstop deforms and recovers no more than 3 inches, preferably between 1-2 inches and most preferably approximately one inch at its maximum deflection.

Figures 2, 3:
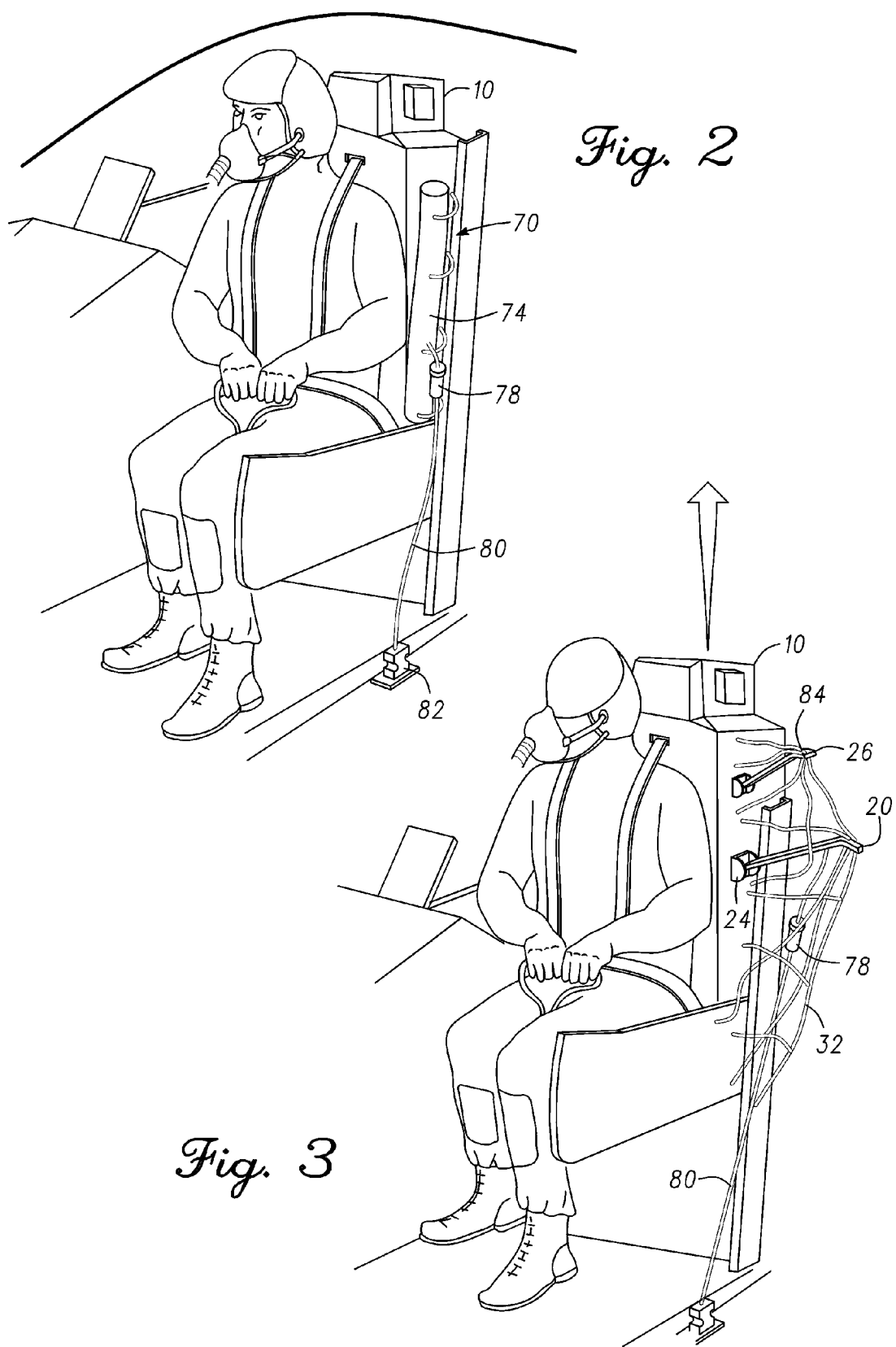
FIG. 2 is simplified drawing showing the ejection seat of FIG. 1 with the arm flail injury prevention apparatus in the stowed position.
FIG. 3 is a simplified perspective view of the ejection seat of FIG. 1 with the arm flail injury prevention apparatus in the partially deployed position.
Figure 4:
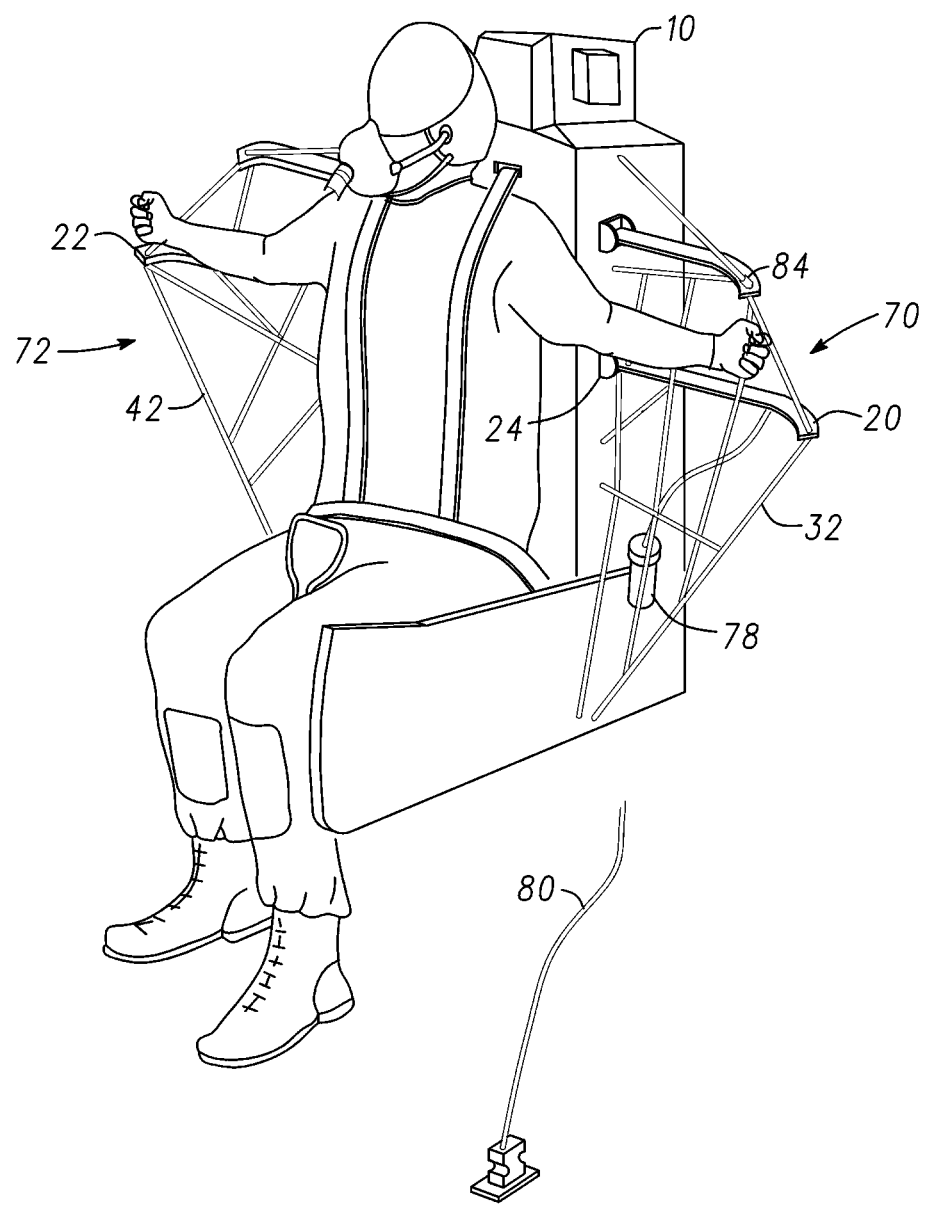
FIG. 4 is a simplified perspective view of the ejection seat of FIG. 1 with the arm flail injury prevention apparatus fully deployed.

FIGS. 2-4 show the operation of ejection 10. With reference to FIG. 2, backstop 70 is shown in its undeployed condition with arms 20,22,26,28 folded against seat back 16 within container 74. Attenuator 78 is attached via deployment cable 80 which is attached to anchor 82 secured to the aircraft frame. As shown in FIG. 3, as ejection seat 10 is propelled out of the aircraft, attenuator 78 pulls lower support arm 20 out of container 74 and along with it primary cable 32 and the remaining components of backstop 70. A splice, cable stop or similar device 84 is attached to primary cable 32 at a predetermined location. As lower support arm 20 is deployed by attenuator 78 cable stop 84 deploys upper support arm 26 to its deployed position. This method of deployment causes primary cable 22 and lower support cable 38 to tension before secondary cable 60. Thus, the section below lower support arm 20 is fully tensioned when lower support arm 20 is at an angle 10 degrees above horizontal while the section above lower support arm 20 is fully tensioned when lower support arm 20 is about 20 degrees below horizontal (relative to the seat back). The function of cable stop 86 acting on upper support arm 28 is substantially identical and therefore will not be discussed in detail herein. Attenuator 88 acts in a similar manner as attenuator 78 to deploy lower support arm 22.

As show in FIG. 4, as ejection seat 10 exits the aircraft, deployment cable 80 continues to pull lower support arm 20 downward thereby tensioning the cables that form backstop 70. At a predetermined tension, a rip stitch in attenuator 78 fractures allowing deployment cable 80 to separate from attenuator 78. The ratcheting hinge 24 attaching lower support arm 20 to frame 12 then locks lower support arm 20 in position against the tension of primary, secondary and tertiary cables, 32, 60, 66. Lower support arm 22 is similarly locked in position by means of its ratcheting hinge. As ejection seat 10 enters the windblast, the occupant's arms flail backwards until they impact backstops 70, 72, which safely arrest the rearward motion of the occupant's arms. Because the frontal area of backstop 70 and 72 is less than ten percent (10%), preferably less than five percent (5%) of the area contained within the perimeter of primary cables 32, 42, the windblast itself safely holds the occupant's arms against the backstop until the ejection seat has slowed to a speed enabling safe separation from the seat.

As can be determined from an inspection of FIG. 1, although backstops 70 and 72 deploy outward, they do not deploy perpendicular to the forward direction of ejection seat 10 but are deployed forward approximately 15 degrees from perpendicular. Accordingly, the invention is not intended to be limited to a backstop in which the entirety of the structure is rearward of the occupant. Any structure in which the occupant's arms are allowed to intentionally flail backwards until the rearward motion is arrested by a backstop with the occupant's arms at a sufficiently oblique angle to the windblast that the windblast itself holds the occupant's arms safely against the backstop is considered within the scope of the invention. Accordingly, although in the illustrative embodiment the forward angle of the backstop is approximately 15 degrees, a forward deployment of zero up to 30, 35 or even 40 degrees forward of perpendicular is considered within the scope of the invention as is any angle of deployment in which the entirely of the structure is rearward of the occupant's elbows at the moment of initiation of the ejection sequence.

Although certain illustrative embodiments and methods have been disclosed herein, it will be apparent from the foregoing disclosure to those skilled in the art that variations and modifications of such embodiments and methods may be made without departing from the invention. Accordingly, it is intended that the invention should be limited only to the extent required by the appended claims and the rules and principles of applicable law. Additionally, as used herein, unless otherwise specifically defined, the terms "substantially" or "generally" when used with mathematical concepts or measurements mean within ±10 degrees of angle or within 10 percent of the measurement, whichever is greater.

What is claimed is:

1. A method of preventing arm flail injuries to an ejection seat occupant subjected to a windblast comprising:
    providing an ejection seat mounted to an aircraft, the ejection seat comprising a seat frame and a propulsion system;
    initiating the propulsion system to propel the ejection seat out of the aircraft;
    in response to the ejection seat being propelled out of the aircraft, deploying a backstop attached to the seat frame to a deployed position to form a forward-facing surface extending laterally outward from the seat frame substantially rearward of the occupant's arms;
    allowing the occupant's arms to flail in a rearward direction in the windblast until the occupant's arms impact the forward-facing surface of the backstop, whereby rearward motion of the occupant's arms relative to the seat frame is arrested.

2. The method of claim 1, wherein:
    the forward-facing surface of the backstop is semi-rigid.

3. The method of claim 1, wherein:
    the forward-facing surface of the backstop deforms no more than 3 inches at any location as the occupant's arms impact the forward-facing surface.

4. The method of claim 3, wherein:
    the forward-facing surface of the backstop deforms a maximum of between 1-2 inches as the occupant's arms impact the forward-facing surface.

5. The method of claim 1, wherein:
the backstop comprises at least one rigid arm supporting a plurality of shrouds.

6. The method of claim 5, wherein:
the plurality of shrouds are formed of a fiber having an elongation of no more than 5%

7. The method of claim 6, wherein:
the plurality of shrouds are tensioned to substantially 200 lbs.

8. The method of claim 5, wherein:
the plurality of shrouds remain attached to the at least one rigid arm as the occupant's arms impact the forward-facing surface.

9. The method of claim 1, further comprising:
separating the occupant from the ejection seat while maintaining the backstop in said deployed position.

10. An ejection seat comprising:
a seat frame having a seat back and a seat pan adapted to support an occupant, the ejection seat further comprising a propulsion system for propelling the ejection seat out of an aircraft;
a passive arm restraint apparatus comprising a backstop that deploys laterally outward from the seat back to form a semi-rigid forward-facing surface substantially rearward of the occupant's arms; and
a static line operably attached between the aircraft and the passive arm restraint apparatus for deploying the passive arm restraint apparatus as the ejection seat is propelled out of the aircraft.

11. The ejection seat of claim 10, wherein:
the backstop comprises at least one rigid arm supporting a plurality of shrouds, forming the semi-rigid forward-facing surface.

12. The ejection seat of claim 11, wherein:
said at least one arm comprises a lower arm pivotally attached to the seat frame, the lower arm pivoting laterally outward from a stowed position to a deployed position, the lower arm further comprising a free end slidingly engaging a primary shroud, the primary shroud having first and second ends operatively attached to the seat frame, whereby said primary shroud is tensioned as said lower arm pivots laterally outward from the stowed position to the deployed position.

13. The ejection seat of claim 12, further comprising:
an upper arm pivotally attached to the seat frame, the upper arm pivoting laterally outward from a stowed position to a deployed position, the upper arm further comprising a free end slidingly engaging the primary shroud, the primary shroud further comprising an enlarged portion that engages the free end of the upper arm to move the upper arm from the stowed position to the deployed position as said primary shroud is tensioned.

14. The ejection seat of claim 13, further comprising:
a plurality of tertiary shrouds operatively attached between the seat frame and the upper arm to form an upper net section.

15. The ejection seat of claim 12, wherein,
the lower arm comprises a substantially "J" shaped rigid member.

16. The ejection seat of claim 12, further comprising:
a plurality of secondary shrouds operatively attached between the seat frame and the primary shroud to form a lower net section.

* * * * *